United States Patent Office 3,528,736
Patented Sept. 15, 1970

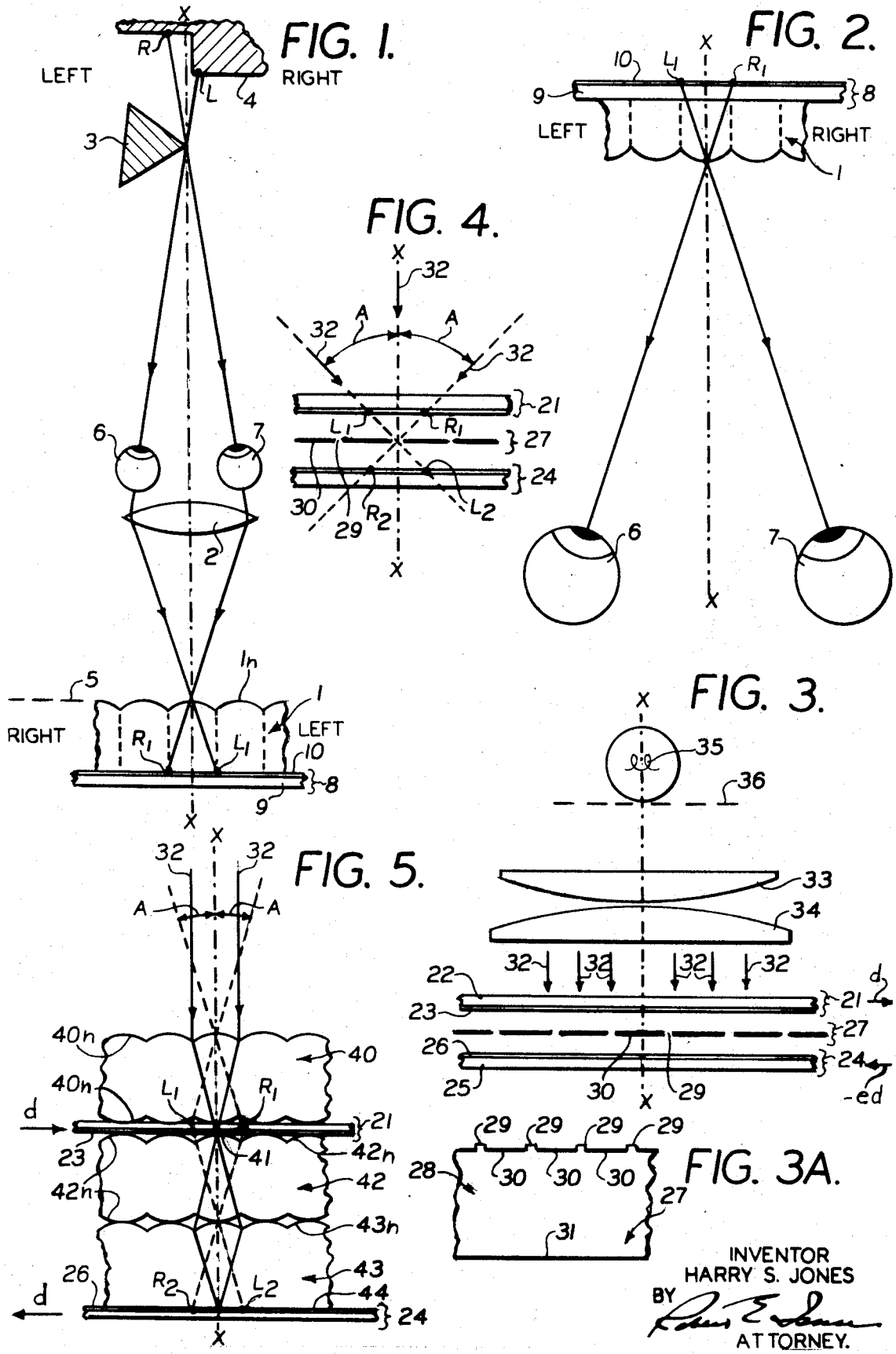

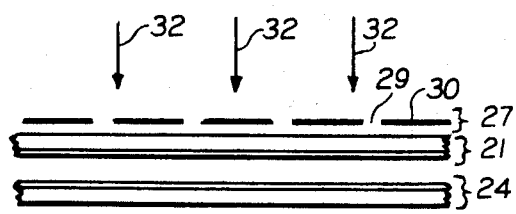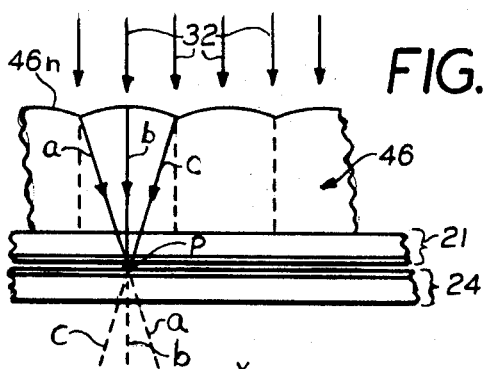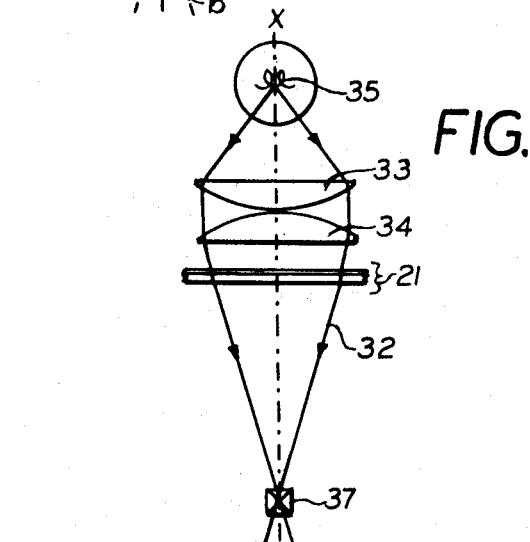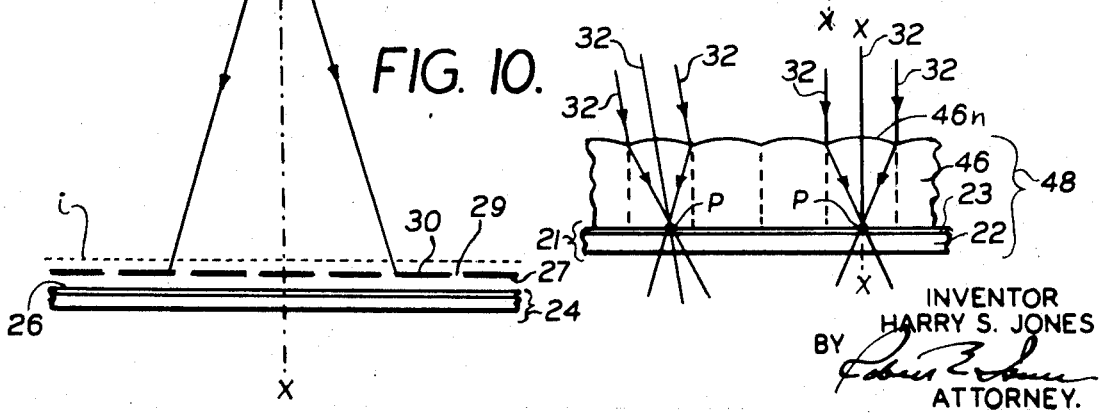

3,528,736
CONVERSION PRINTING METHOD FOR RELIEF PHOTOGRAPHS
Harry S. Jones, Monmouth Beach, N.J., assignor to Chrom-Tronics, Inc., New York, N.Y., a corporation of New York
Filed June 27, 1967, Ser. No. 649,307
Int. Cl. G03b 27/44
U.S. Cl. 355—22                                12 Claims

ABSTRACT OF THE DISCLOSURE

Apparatus for converting abnormal relief photographs into true three-dimensional reproductions of the photographed subject by means of effecting controlled degrees of relative displacement between the film bearing the abnormal image. An unexposed photosensitive film and scanning means is disposed intermediate a remote source of illumination and the unexposed photosensitive film.

---

This invention relates to relief photography and particularly to an improved method of converting abnormal three-dimensional or relief photographic images into true photographic reproductions thereof of selected dimension.

The obtaining of relief or three-dimensional images or effects in the photographic arts has, for many years, challenged the skilled workers in this field. While the basic theory and the nature of the problems involved have long been known and understood, the present day dearth of simple, commercially-practical and inexpensive relief photographs and methods of obtaining the same cogently demonstrate the continued inability of the art to solve the problems involved.

Among the major problems faced is the complexity of camera construction and operation at set ups required for the taking of normal, as distinguished from abnormal, relief images. Such complexity, with its attendant expenses and need for control have limited the field of use of relief photography for the professional photographer and have effectively precluded the entry of the amateur photographer therein.

This invention may be briefly described as an improved method of converting abnormal relief or three-dimensional photographic images into normal or true three-dimensional reproductions of the photographed subject of selected size and in its bread aspects includes an improved method of printing by which the abnormal images that are normally attendant the use of simplified camera apparatus of the snapshot type are converted into normal relief images of the subject.

Among the advantages of the subject invention is the provision of an improved printing conversion system of simple and inexpensive character that will, inter alia, render the use of snapshot type cameras employing a large aperture lens with a grating or lenticular system disposed intermediate the objective and the film plane both practical and feasible in the taking of relief photographs. Other advantages include the permitted use of short exposure times and a simplicity of camera construction that effectively removes the physical and operational limitations that have heretofore impeded the expansion of the relief photography art.

As used herein, an "abnormal" relief or three-dimensional image will be one in which, as the viewer's head is moved to his right, the left side of the subject (i.e. relative to the viewer's left hand) will be increasingly revealed in contradistinction to the normal appearance of any subject in which, as the viewer's head is moved to the right, the right side of the subject (i.e. relative to the viewer's right hand) is increasingly revealed.

The object of this invention is the provision of an improved photographic printing method for the conversion of abnormal relief photographic images into true and selectively sized three-dimensional representations of the image subject.

Other objects and advantages of the invention will be apparent from the following portions of this specification and from the accompanying drawings which illustrate the principles of this invention as they would be incorporated into presently preferred embodiments thereof.

Referring to the drawings:

FIG. 1 is a schematic representation of the essentials of a simple snapshot type photographic system employing the full lens aperture width of a large lens and a simple lens overlay for the taking of relief photographs;

FIG. 2 schematically illustrates the abnormal character of the relief images produced by the simple type of camera system shown in FIG. 1;

FIG. 3 is a schematic representation of apparatus elements included in one type of printing system incorporating the principles of this invention;

FIG. 3A is an enlarged fragmentary sectional view of a scanning grid construction;

FIG. 4 is an enlarged schematic view of a modification of the system shown in FIG. 3;

FIG. 5 is an enlarged fragmentary sectional view of a further modification of the system shown in FIG. 3;

FIG. 6 is a schematic profile view of another modification of the system shown in FIG. 3;

FIG. 7 is an enlarged fragmentary sectional view of another modification of the system shown in FIG. 3;

FIG. 8 is a schematic representation of apparatus elements includable in a projection type of printer incorporating the principles of this invention;

FIG. 9 is a schematic representation of apparatus elements includable in a modification of the projection type printer shown in FIG. 8; and FIG. 10 is a fragmentary sectional view of a modification of projection printer construction shown in FIG. 9.

In the interests of brevity and clarity and because the same are well within the knowledge and capabilities of those skilled in this art, the following portions of the specification will omit detailed descriptions of means for effecting film displacement, exposure timing and other mechanical camera construction features. For similar reasons, the camera lens 2 is illustrated as an equivalent simple lens located in the position of the iris stop of a typical camera lens.

Referring to the drawings and initially to FIG. 1 thereof, there is illustrated certain of the operation essentials of a simple relief camera of the so-called snap-shot type whose use will be facilitated and expanded by the invention disclosed and described herein. Such a camera includes, in association with a light tight housing, lens stop and shutter and the like (not shown), a relatively large aperture lens 2 disposed in adjustable spaced relation from a film 8 therein, a light-sensitive emulsion 10 disposed on a substrate 9. A relatively thin multi-element lens overlay 1 having a plurality of discrete cylindrical lens elements $1n$ on its upper surface is disposed intermediate the lens 2 and film 8 and is located so that its optically-flat undersurface is disposed in intimate interfacial engagement with the emulsion 10. As will be apparent from the drawing, the lens 2 forms an image of a solid subject such as objects 3 and 4 on an average focal plane, indicated by the dotted line 5, that is located close to the cylindrical elements $1n$ of the lens overlay 1. When the described system functions in its normal scale, the individual lens elements $1n$ are small compared with the aperture of the camera lens 2 and form an image of the aperture between points $R_1$ and $L_1$ on the emulsion surface 10 wherein the right hand region of the lens 2 is focused upon a small area at $R_1$ and the left hand region of the lens 2 is focused upon a small area at $L_1$. As also illustrated in FIGS. 1 and 2, the left side of lens 2 sees what the left eye 6 of an observer would see and concomitantly therewith, the right side of lens 2 sees what the right eye 7 of such an observer would see. Due to the inverting characteristics of the camera lens 2, the left side of the three-dimensional subject is thus imaged on the right side of the film segment, as viewed from a position on the film side of lens 2 and that the right and left points R and L will be imaged at points $R_1$ and $L_1$ in right to left hand order on the film 8.

Such an image, however, will be an "abnormal" rather than a normal relief image. For example, if after developing, the film 8 is turned upside-down so that the left-hand side of the subject is on the left side, the left and right hand points $L_1$ and $R_1$ will be in left to right hand order. However, as shown in FIG. 2, a left eye 6 viewing the film 8 through a lens overlay 1 placed in contact with the base 9 thereof (rather than the emulsion side 10) will then see an "abnormal" or "pseudoscopic" relief or three-dimensional view of the photographed objects 3 and 4, since the left eye 6 will then see what the right eye 7 should see, and vice versa. Actually, in order to convert from the obtained "abnormal" image to a "normal" one, the relief data recorded under each of the lens elements $1n$ must be individually and selectively inverted *without* right and left hand reversal of the overall format of the photographed image. This type of selective image inversion cannot be effected by simple reverse-printing operations since such printing functions to reverse both the right and left sides of the total image as well as the discrete right and left relief data segments.

While abnormal relief images of the type discussed above may be converted to normal images by means of the various corrective systems disclosed in my copending applications, Ser. Nos. 649,311 and 649,312, filed June 27, 1967, this invention effects image conversion by optical scanning methods wherein the continuous sequence of the left to right hand relief views recorded under the individual lens elements of the multi-element lens overlay are selectively reversed without simultaneous reversal of the right and left hand sides of the over-all format of the image.

Referring now to FIG. 3, an abnormal relief photograph in the form of a negative or a transparency 21 is disposed adjacent one side of a scanning grid member 27 with converted image receiving film 24 being disposed adjacent the other side thereof. The film 21 is positioned so that the elongated image segments thereon are disposed parallel to the slits in the grid member 27.

For practical reasons the grid 7 should, as illustrated in FIG. 3A, preferably be constructed of a plate or sheet of transparent material 28 such as plastic or glass having relatively narrow slits 29 formed by carefully spaced opaque strips 30 in the surface thereof. The slits 29 are of appreciably smaller transverse dimensions than the opaque strips 30.

Since the resolution of the contiguous series of views recorded under each lens element of the lens overlay used to obtain the original and abnormal relief photograph 21 is usually of a relatively low order, the width of transparent strips 29, when desired, may be as large as 5% of the width of opaque regions 30 although they are preferably maintained at smaller values thereof.

The opaque strips 30 may be produced by etching or by any other suitable means and filled with opaque material. This procedure will leave flat transparent slits 29 having planar light transmitting surfaces on one surface of the glass sheet while the opposite surface 31 remains unchanged.

If the film elements 21 and 24 and the interposed grid members 29 are illuminated by substantialy parallel light rays 32 produced by a discete light source 35 via condensing lens elements 33 and 34 the underlying film 24 will be exposed as a "normal" duplicate of the "abnormal" film 21 when the latter is lineally and uniformly displaced in a direction transverse to the slits 29 through a distance $d$ equal to the width of one lens element $1n$ of the multi-elements lens overlay 1 used to expose film 21 while the secondary film 24 is uniformly and lineally displaced in the opposite direction through a distance equal to the distance traversed by the abnormal film 21. The specific displacements of the film elements 21 and 24 are effected relative to the fixedly located grid, lens and light members 27, 33, 34 and 35.

If the illuminant rays 32 are essentially parallel, the corrected or normal secondary print 24 will be identical in size with that of the abnormal original film 21. However, if the rays 32 diverge away from the axis X—XX as they pass through the film and grid elements 21, 27 and 24, the normal print 24 will be enlarged in size whereas conversely if the rays 32 converge toward the axis X—X, the normal print 24 will be reduced in size and selective size variation of the normal print 24 may be conveniently effected by control of the character of illumination 32. Such character of illumination, whether parallel, divergent or convergent, may be conveniently delineated as the "degree of angular collimation relative to the optical axis." In actual practice, the effective amount of the reduction or enlargement that may be achieved by means of nonparallel illuminant rays 32 will be limited by the accuracy and uniformity of the divergence and convergence of rays 32 and the spacing between film elements 21 and 24 and the grid 27.

When the normal photographic image is to be enlarged or reduced by the technique disclosed above, the amount of displacement $-d$ of the normal film 24 must be multiplied by the enlargement ratio $e$ and, of course, when $e$ equals 1, there is no size change. Therefore, the degree of displacement of the normal film 24 is conveniently expressed as $-ed$. In some cases it may be more desirable to provide a velocity ratio $v$ and $-ev$ corresponding to $d$ and $-ed$ and to limit the effective traverse of the grid scan to the distances $d$ and $-ed$ by exposing film 24 only for a time $t=d/v$, by means of a timed shutter member 36 not shown in detail, or by any other usual means.

In lieu of exposure by lineal film displacement scanning as described above, the desired scanning may also be accomplished by arcuately displacing the elements 21, 24 and 27 conjointly as a fixed group through an angle 2A, as shown in FIG. 4, relative to substantially-parallel illuminant rays 32 which may be produced as shown in FIG. 3. With such type of displacement, the velocity of angular displacement through the angle 2A should be such as to result in uniform exposure of film 24.

It will be clear to those skilled in this art that the abnormal relief photographs obtained with spherical lenses used in lieu of cylindrical lenses $1n$ in a simple snapshot camera of the type shown in FIG. 1 may be converted into normal relief photographs of the omni-directional or two-axis type using the assembly of FIG. 4. To accomplish this, the assembly of FIG. 4 must be tilted or scanned in such a manner as to cover a solid angle 2A in lieu of the plane angle 2A. Any angular pattern of scan may be used to cover solid angle 2A provided the form of scan pattern and the velocity variation are such that the relief data circles of diameter $R_2L_2$ obtain uniform light exposures.

FIG. 6 shows a modified arrangement wherein the positions of the abnormal film 21 and the grid 27 have been interchanged so that the abnormal film 21 is disposed between the grid 27 and the second film 24. In operation, this system is similar to that shown in FIG. 3 and described above and when the film 21 is displaced in one direction through the distance $d$ the second film 24 must be moved in the opposite direction by the same amount, i.e., $-d$ for unity magnification. Here again, enlargement or reduction in size can be effected by the spacing of elements 21, 24 and 27 and the divergence or convergence of normally-parallel rays 32 will determine the enlargement factor $e$, as described above in conjunction with the system shown in FIG. 3. Illuminant rays 32 should again be substantially parallel as above specified, or accurately divergent or convergent when enlargement or reduction of image size is desired on secondary film 24.

In photographic systems of the type used by the printing trade, it is usually necessary to reduce or enlarge the size of any illustration that is to be printed in quantity. This effectively requires that all three-dimensional data containing films or transparencies must be enlarged or reduced in some manner before printing plates can be made. In conjunction therewith it should be noted that increasing numbers of illustrations are now in color and, since accuracy of color rendition is an ever present problem, it would be highly advantageous if the conversion from abnormal to normal relief characteristics could be accomplished at the same time that color separations are made to the size required for printing.

FIG. 8 shows the operative elements of a system incorporating the principles of this invention that permits any abnormal relief photograph to be converted to a normal photograph while it is concurrently being enlarged or reduced in size to any desired degree and during which either a duplicate transparency or color separation may be directly made. In the illustrated system, the original abnormal relief film 21 is illuminated by a suitable light source 35 through condensing lens elements 33 and 34. An enlarged or reduced image of the entire format of the film 21 is projected by a high quality graphic art lens 37, as for example, the well-known Goerz Artar lens. Disposed directly beneath the image $i$ of film 21 projected by the lens 37 is a grid 27 and secondary film 24 closely adjacent thereto. The grid 27 should be constituted so as to have substantially the same number of transparent strips 29 per unit of length as the number of lens elements $1n$ per unit length included in the lens overlay 1 used to expose the film 21 for an enlargement ratio $e$ of unity. However, when the enlargement ratio $e$ is to be greater than unity, the number of transparent strip elements 29 per unit length in grid 27 should be equal to the number of lens elements $1n$ per unit length employed in exposing the film 21 divided by $e$. Conversely when the enlargement ratio is to be less than unity there will be employed, of course, a greater number of elements 29 per unit length.

To effect exposure of a normal or corrected photograph on the second film 24 the grid 27 is transversely displaced exactly the width of one relief data strip, that is, the width of a lens element $1n$ of the original lens overlay as modified by the enlargement factor $e$, while film 24 is concurrently moved in the same direction by a distance equal to twice that of the grid 27, i.e. by a distance $2ed$. Both displacements must, of course, be at uniform rate and the exposure must occur only during the traverse and not prior to or subsequent thereto. Thus, by controlling the time of exposure to correspond to a traverse of one relief data strip by grid 27 in image plane $i$ as for example, by a timed opening of a conventional shutter within lens 37, a "normal" relief print will be exposed at any desired scale. In practice, the image plane $i$ may actually fall slightly above or below the scanning grid 27 and emulsion layer 26 of film 24 with negligible effect upon the results obtained.

FIG. 9 shows a modification of the system shown in FIG. 8 and in which the scanning grid 27 is placed adjacent to and over the abnormal relief film 21. In this embodiment, the image $i$ of film 21 and scanning grid 27 is projected by lens 37 directly upon emulsion 26 of the second film 24. If desired, the grid 27 can be located adjacent to the underside of film 21. In order to effect exposure of a normal print of film 21 upon the second film 24, the scanning grid 27 is transversely displaced by an amount equal to the width of one lens element of the lens overlay used to originally expose the film 21 while the film 24 is conjointly displaced in the opposite direction by a distance equal to $2e$ times the amount of film 21 displacement. Here again, the motion of scanning grid 27 and film 24 are, of course, relative to fixed elements 21, 33, 34, 35 and 37.

If enlargement or size diminution is not required, multi-element lens overlays, such as planar cylindrical lens overlays, may be utilized in lieu of the heretofore described scanning grids 27, thereby permitting a substantially shorter exposure of the secondary film 24. Referring to FIG. 5, the film 21 bearing the abnormal relief image in its emulsion 23 is disposed intermediate a pair of double surfaced multi-element lens overlays or arrays 40 and 42 each having a plurality of cylindrical lens elements $40n$ and $42n$ disposed on both their surfaces. A third lens overlay 43 having cylindrical lens element $43n$ on one surface thereof is disposed adjacent to the underside of overlay 42 and the secondary film 24 is positioned in interfacial relation with the flat undersurface 44 thereof. Each of the lens arrays 40, 42 and 43 are of substantially the same thickness and contain identical lens elements disposed in coaxial relation.

As shown, substantially parallel illuminating rays 32 are focused by a typical lens element $40n$ of the first overlay 40 to a small line 41 corresponding to the transparent grid lines 29 of the scanning grid 27, as heretofore described.

As in the system shown in FIG. 6 and heretofore described, the film 21 bearing the abnormal image is uniformly displaced a transverse distance equal to the width of one lens element $40n$ and concurrently therewith the second film 24 is moved in the opposite direction by the same distance to effect exposure of a normal relief image on the second film 24. Elements 40, 42 and 43 remain fixed.

The entire apparatus of FIG. 5 may also, when desired, be tilted as an assembly in collimated rays 32 through an angle $2A$ to provide uniform exposure as heretofore described without movement of either film 24 or film 24. When such angular scanning is used all relief data points between points $L_1$ and $R_1$ on emulsion 23 of film 21 will be transferred in reverse order between points $L_2$ and $R_2$ on emulsion 26 of film 24. It will also be clear to those skilled in this art that if lens elements $40n$, $42n$ and $43n$ of FIG. 5 are spherical the abnormal relief photographs obtained with spherical lenses used in lieu of cylindrical lenses $1n$ and a simple snapshot camera of the type shown in FIG. 1 may be converted into normal relief photographs of the omni-directional or two-axis type. To accomplish this the assembly of FIG. 5 must be tilted or scanned in such a manner as to cover a solid angle $2A$ in lieu of the plane angle $2A$. Any angular pattern of scan may be used to cover solid angle $2A$ provided the form of pattern and the velocity variations are such that the relief data circles of diameter $R_2L_2$ obtain uniform light exposure.

In the system illustrated in FIG. 7, the scanning grid 27 of the heretofore described system of FIG. 6 is replaced by a cylindrical lens array 46 having cylindrical lens elements $46n$ substantially identical with those used in the camera to expose film 21. This system is otherwise quite similar to the system shown and heretofore described in conjunction with FIG. 6 and will function in substantially the same manner, except that the lens elements $46n$ will provide appreciably more light at a small area close to point P on film 21 and film 24, than would the transparent grid elements 29 of scanning grid 27. However, due to the divergence of ray elements $a$, $b$ and $c$ below the point P the abnormal image-bearing film 21 and film 24 must be located close together, preferably with their surfaces in actual contact. Rays 32 must, of course, again be substantially parallel, as heretofore specified and the film 21 must be moved a transverse distance $d$ equal to the width of one lens element 46$n$ of the lens array 46 at uniform velocity to insure uniform exposure of film 24 which is concurrently displaced in the opposite direction through the same distance $d$.

Likewise, as shown in FIG. 9, a cylindrical lens array 46 may be substituted for the scanning grid 27 illustrated in the FIG. 9 embodiment. When so modified, a thin line image of light source 35 will be focused by each lens element 46$n$ at points P corresponding to the transparent slits 29 of scanning grid 27 and when lens array 46 is moved in the FIG. 10 system, a normal print will be exposed on film 24. Also, as heretofore pointed out, the subassembly 48 of the overlay 46 and abnormal image bearing film 21 may be rotated about optical axis X—X through an angle 2A and corrective scanning and printing may be accomplished by rotation rather than by transverse displacement of these elements.

Having thus described my invention, I claim:

1. Apparatus for converting abnormal relief photographs constituted by a sheet of film having a plurality of elongate relief data strips each containing a continuous sequence of relief image data in reverse orientation thereon comprising illumination means having an optical axis disposed on one side of said abnormal photograph, optical means disposed intermediate said illuminating means and said abnormal photograph for controlling the degree of angular collimation relative to an optical axis of the light incident on said abnormal photograph, a photosensitive film disposed on the side of said abnormal photograph positioned remote from said illumination means, scanning means containing spaced apertures oriented substantially parallel with said elongate relief data strips disposed intermediate said illuminating means and said photosensitive film, and means for effecting selectively controlled displacement between said abnormal film, photosensitive film and scanning means relative to the optical axis of said illuminating means to effect reverse order sequenced exposure of said relief image data upon said photosensitive film.

2. Apparatus as set forth in claim 1 wherein said scanning means comprises a grid member having a plurality of elongate transparent slits oriented substantially parallel with said elongate relief data strips.

3. Apparatus as set forth in claim 1 wherein said scanning means comprises a multi-element lens overlay.

4. Apparatus as set forth in claim 1 wherein said scanning means is located intermediate said abnormal film and said photosensitive film.

5. Apparatus as set forth in claim 1 wherein said scanning means is located intermediate said illumination means and said abnormal film.

6. Apparatus as set forth in claim 2 wherein said elongate transparent slits on said grid means are separated by opaque areas of greater extent.

7. Apparatus as set forth in claim 2 wherein said elongate transparent slits on said grid means are spaced apart a distance substantially equal to the width of said relief data strips.

8. Apparatus as set forth in claim 1 wherein said displacement is effected by relative motion in planes transverse to the optical axis of said illuminating means.

9. Apparatus as set forth in claim 1 wherein said displacement is effected by conjoint rotative displacement of said abnormal film, photosensitive film and scanning means as a unit about an axis perpendicular to said optical axis.

10. Apparatus as set forth in claim 1 including projecting lens means disposed intermediate said scanning means and said photosensitive film for effecting exposure of a selectively sized inverted image on said photosensitive film.

11. Apparatus as set forth in claim 1 including projecting lens means disposed intermediate said scanning means and said illumination means for effecting exposure of a selectively sized inverted image on said photosensitive film.

12. Apparatus for correcting abnormal relief photographs constituted by a sheet of film having a plurality of discrete relief data areas each containing a continuous sequence of relief image data in reverse orientation thereon comprising illumination means having an optical axis disposed on one side of said abnormal photograph, optical means disposed intermediate said illuminating means and said abnormal photograph for controlling the degree of angular collimation relative to an optical axis of the light incident on said abnormal photograph, a photosensitive film disposed on the side of said abnormal photograph positioned remote from said illumination means, scanning means containing substantially circular elements oriented substantially coaxial with said relief data areas disposed intermediate said illuminating means and said photosensitive film, and means for effecting rotative displacement between said abnormal film, photosensitive film and scanning means as a unit through a solid angle about an axis perpendicular to the optical axis of said illuminating means to effect reverse order sequenced exposure of said relief image data upon said photosensitive film.

References Cited

UNITED STATES PATENTS

| | | | |
|---|---|---|---|
| 1,882,424 | 10/1932 | Ives | 352—58 X |
| 1,905,469 | 4/1933 | Ives | 355—22 X |
| 2,622,472 | 12/1952 | Bonnet | 352—58 |

NORTON ANSHER, Primary Examiner

R. A. WINTERCORN, Assistant Examiner

U.S. Cl. X.R.

352—58, 81